Aug. 25, 1925.
G. E. BEGGS
1,551,282
METHOD OF DETERMINING STRESSES IN STRUCTURES
Filed March 30, 1922    2 Sheets-Sheet 2
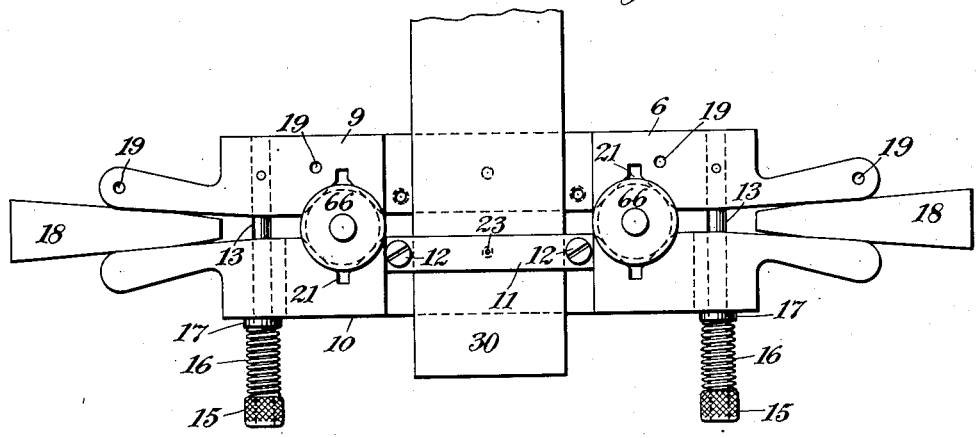
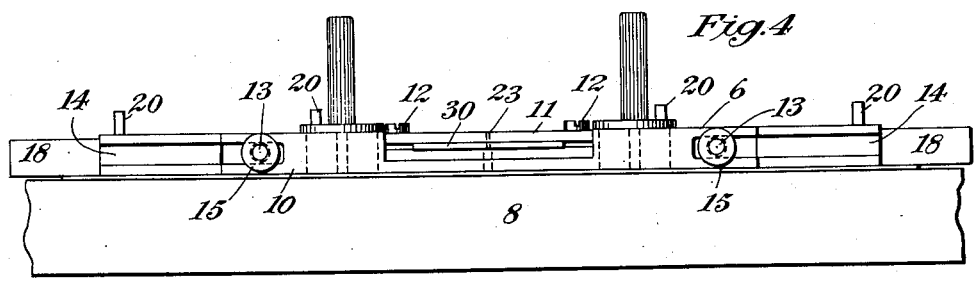
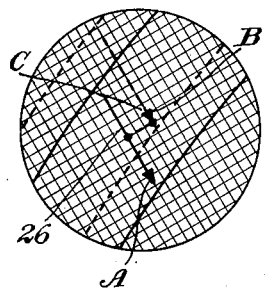
INVENTOR,
George E. Beggs,
BY
Andrew Wilson,
ATTORNEY.

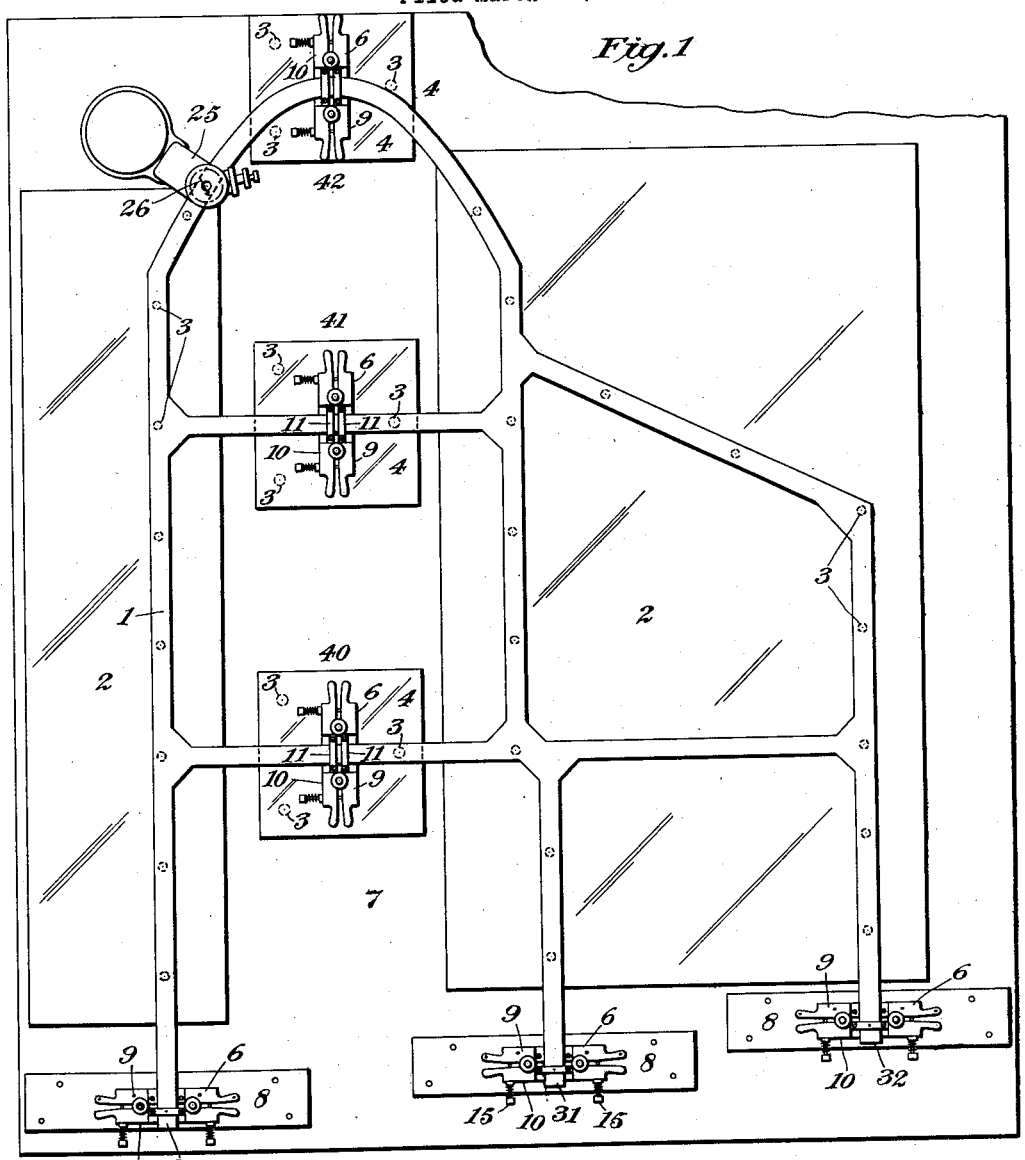

Patented Aug. 25, 1925.

1,551,282

UNITED STATES PATENT OFFICE.

GEORGE E. BEGGS, OF PRINCETON, NEW JERSEY.

METHOD OF DETERMINING STRESSES IN STRUCTURES.

Application filed March 30, 1922. Serial No. 547,988.

*To all whom it may concern:*

Be it known that I, GEORGE E. BEGGS, a citizen of the United States, residing at Princeton, New Jersey, have invented certain new and useful Improvements in Methods of Determining Stresses in Structures, of which the following is a specification.

My invention relates to a novel method of determining stresses in structures by employing a model of a section of the structure, made, preferably, on the plane of assumed stress, mechanically producing definite deflection in the model at the point where the stress is to be determined, and observing the consequent deflection in the model at the hypothetical load point. By comparing the deflection of the model at the load point with its deflection at the point of stress, the proportion of that stress to the applied load may be accurately determined.

This method may be applied to both simple and complicated structures; and, particularly in the latter class of structures, it avoids the use of the tedious and complicated mathematical computations, which, heretofore, it has been customary to make in estimating stresses.

In practice I have found that the results given correspond very closely with those obtained by the old, mathematical methods.

The application of my new method of determining stresses may be explained by referring to the accompanying drawings, in which Fig. 1 is a plan view of a model of an assumed plane of stress through a structure, showing deflection producing means applied to it at several points, and deflection observation means, in suitable position; Fig. 2 is an edge view of the same, looking up on Fig. 1, but omitting the observation means; Fig. 3 is a plan view, on a much enlarged scale, of a deflection producing device which may be called a deformeter gage; Fig. 4 is an edge view of the same, looking up on Fig. 3; Figs. 5, 6, 7 and 8 are bottom views of a series of gage plugs for use with the deformeter gage; and Fig. 9 is a diagrammatic, plan view, taken on a much enlarged scale, as though looking through a microscope, illustrating the deformation of the model at an assumed load point.

Similar parts are designated by corresponding reference numerals in all the figures.

The model 1 is made of a material of such a character that its stiffness at any point will correspond substantially, in proportion, to the stiffness in the considered structure at the same point. A sheet of celluloid, or heavy paper, or card board may be used with satisfactory results, based upon the usual assumption that the structure under its load is not deflected materially from its geometric shape, the positions of the members of the structure when deflected being essentially parallel to their geometric positions.

This model should be supported in such a way that its various parts may move freely, so that the result of deformation at any point may produce its appropriate effects at the other points in the model, without material interference from friction.

This may be accomplished by employing smooth or polished sheets 2, 2, for instance of glass, to form a supporting bed for the model, and placing between the model and bed small balls 3, 3, to act as bearings.

At interior or intermediate points of the model at which it is desired to determine stress, the model and deforming means may be placed upon a small, smooth, sheet 4, of, for instance, glass, which, in turn, is supported by balls 3, 3, interposed between it and a smooth, lower sheet 5; so that the upper sheet and its load may move freely in relation to the lower sheet.

The deformeter gages, 6, 6, are disposed so that their model-engaging portions shall lie in the same horizontal plane, thereby preventing vertical distortion of the model in the normal application of the gages. Thus the three gages shown at the bottom of Fig. 1 are raised above the foundation board or base 7 by suitable blocks 8, 8. And it should be understood that the plates 2, and 5 are blocked up, if necessary, to bring their upper surfaces to the proper levels.

The type of deformeter gage 6, shown, embodies two bars 9, 10, one or both of which may be clamped to the model, as, for instance, by straps 11, 11 secured to the bars by suitable pins 12, 12 threaded into the bars, so that a part of the model may be passed under the straps and gripped by screwing home the pins. In Fig. 3, and in each of the clamps at the bottom of Fig. 1, one of the straps 11 is omitted.

Pins 13, 13 are fixed into the bar 9, and extended through slots 14, 14 in the bar 10, and have nuts 15, 15 threaded onto them and acting as keepers for coiled springs 16, 16 surrounding the pins and interposed between the nuts and suitable washers 17, 17 resting against the bar 10. This allows the bars to be separated from each other, as by the insertion between their opposed ends of one or more wedges 18, 18, and to be pushed together again by the springs 16, 16 when the wedges are removed.

The bar 9, is also provided with suitable means, as the holes 19, 19, through the medium of which it may be fastened to the base 7, as by passing pins 20, 20 down through the holes into the base.

Sockets or bearings 21, 21 are formed in the opposed faces of the bars 9, 10, to receive selected plugs, as from a series, 55, 55: 66, 66; 77, 78: 88, 88: of accurately determined relative sizes and shapes, the insertion of selected plugs between the bars serving to separate them more or less widely, either in parallel or at an angle to each other, or, if form 88 is used, to shift them longitudinally in relation to each other. The plugs 55, 55, and 66, 66, are employed to determine thrust $a^{55}$ and $a^{66}$, or 77, 78 for moment; and 88, 88 shear in either direction.

The plugs 55, 55 are of a size to separate the bars 9, 10 into a greater than normal position; the plugs 66, 66 are of a definitely smaller size, and, when inserted, will reduce the distance between the bars 9 and 10 to less than normal; the plugs 77, 78 are of unequal sizes so as to hold the bars 9 and 10 at an angle to each other.

Above the assumed load point on the model I place a micrometer microscope 25, the cross lines of the microscope field being oriented in the direction of the applied load, which, for convenience, may be shown upon the model, as indicated by the solid arrow 26, shown in Fig. 9. This permits any movement of the load point to be accurately observed, and measured by referring to the cross lines.

If, now, it is desired to ascertain the thrust produced at a given point, for instance 30, of the structure, by a load P applied at another given point, for instance A, acting in the direction C A, that may be done as follows.

Place the deformeter gage, with round normal plugs similar to 55, 55 and 66, 66 but of a size intermediate and preferably half way between 55, 55 and 66, 66 in position between its bars, upon the base 7, beneath the part 30 of the model, and secure the bar 9 to the base by passing pins 20, 20 down through the holes 19, 19 and into the base, a thin piece of paper being, preferably, placed beneath the bar 9 to elevate it slightly and thereby give the bar 10 clearance and freedom of movement. By means of the strap 11 clamp the part 30 of the model to the bar 10. Remove the two round normal plugs by inserting the wedges 18, 18 between the ends of the bars 9 and 10. Insert the pair of larger plugs 55, 55 in the gage. Read in the microscope the position of the load point A in the model. Next remove the plugs 55, 55, and place the smaller plugs 66, 66 in the gage. The load point A will be seen, through the microscope, to move along a straight line to a point B, the arrow shifting its position as illustrated by the broken lines in Fig. 9.

Take a reading of the position B, and by difference obtain the deflection $AC=d_2$. If the total thrust deformation introduced by the deformeter gage be $d_1$, the value of the thrust at the support in question equals $(d_2/d_1)P$, and is a compression; for the upward deflection at the support has caused the load point A to deflect in a direction opposite to the direction C A of the applied load. In a similar way the stresses may be obtained at other determined points in the structure, as 31 and 32.

This mechanical method, therefore, gives both the sign and value of the desired component of the reaction. To obtain the moment and shear at the same section, the moment plugs 55, 66 or 77, 78, and shear plugs 88, 88 respectively may be used, in similar manner, and values of moment and shear calculated from the two corresponding deflection measurements made with the microscope.

If the point 30 represents a hinged support, the strap 11 is omitted and the part 30 is held to the bar 10 by the pin 23 which is fastened to the bar 10, and, normally, passes up through a hole in strap 11.

If the moment, shear, and thrust at some interior section of an internally indeterminate structure must be found, the gage is clamped at such section by means of both straps 11, 11, as shown at 40, 41 and 42. The model is cut between the straps 11, 11. The three sets of plugs for moment, shear, and thrust are then introduced in succession, the corresponding deflections of the load points of the model are read through the microscope, and the corresponding moment, thrust, and shear at the section evaluated as before.

The reactions and stresses calculated by the model deflections satisfy very well the three laws of equilibrium, and agree reasonably well with the values obtained by theory. There is no reason to believe that the theory values are more accurate than those obtained by the model.

Analysis by elastic models, as above indicated, gives a practical method of solving the stress problem of complicated structures, as well as of simple ones. It greatly simplifies the work of the engineer and designer; and puts at his command an efficient means for graphically testing and determining the results of complicated mathematical computations.

It should be understood that the particular means, which I have shown, and described for putting my improved method into effect are to be considered as illustrative and not as exclusive types. For means of modified form, but of equivalent effect in carrying out the steps of the method, might be employed by those skilled in the art, without departing from the spirit of my invention as claimed.

Having thus described my invention what I claim and desire to secure by Letters Patent of the United States, is:—

1. The method of determining stresses in structures, consisting in forming a model of a section of the structure, introducing a movement of predetermined extent at a place of stress, and observing the induced movement of the model at an assumed load point.

2. The method of determining stresses in structures, consisting in forming a model of a section of the structure in the plane of stress, introducing a movement, of predetermined extent in that plane at a place of stress, and observing the induced movement of the model at an assumed load point.

3. The method of determining stresses in structures, consisting in forming a model of a section of the structure, so proportioned that its parts shall have the same relative stiffness as the corresponding parts of the structure, introducing a movement of predetermined extent at a place of stress, and observing the induced movement of the model at an assumed load point.

4. The method of determining stresses in structures, consisting in forming a sheet model of a section of the structure, introducing a movement of predetermined extent at a place of stress, and observing the induced movement of the model at an assumed load point.

5. The method of determining stresses in structures, consisting in forming a fibrous, sheet model of a section of the structure, introducing a movement of predetermined extent at a place of stress, and observing the induced movement of the model at an assumed load point.

6. The method of determining stresses in structures, consisting in forming a model, on a greatly reduced scale, of a section of the structure, introducing a movement of predetermined extent at a place of stress, and microscopically observing the induced movement of the model at an assumed load point.

7. The method of determining stresses in structures, consisting in forming a model of a section of the structure, supporting it so that it may move freely in its plane, introducing a movement of predetermined extent at a place of stress, and observing the induced movement of the model at an assumed load point.

8. Means for simulating stresses in structural models, embodying a plurality of model engaging means, and means, including a plurality of optionally applicable measuring elements of accurately, predetermined sizes, for changing the relative positions of the several engaging means.

9. Means for simulating stresses in structural models, embodying a plurality of model engaging means, and means consisting of a plurality of independent units of definite geometric forms of accurately predetermined sizes, optionally insertable between and for changing the relative positions of the several engaging means.

10. Means for simulating stresses in structural models, embodying a plurality of model engaging means, and means consisting of a plurality of independent cylindrical units of definite geometric forms of accurately predetermined sizes, optionally insertable between and for changing the relative positions of the several engaging means.

11. Means for simulating stresses in structural models, embodying a pair of opposed model engaging means provided with gage sockets therebetween, and means, including gages of accurately predetermined sizes and severally insertable in said sockets, for changing the relative positions of the members of the pair of engaging means.

12. Means for simulating stresses in structural models, embodying a pair of normally parallel bars each provided with gage seats therein and with attaching means, yieldable connecting means permitting relative movement of the bars in the same plane, and a plurality of gages adapted to be selectively placed in the gage seats to vary the relative positions of said bars.

13. Means for simulating stresses in structural models, embodying a pair of normally parallel bars each provided with gage seats therein and with a clamping element constituting attaching means, yieldable connecting means permitting relative movement of the bars in the same plane, and a plurality of gages adapted to be selectively placed in the gage seats to vary the relative positions of said bars.

14. Means for simulating stresses in structural models, embodying a pair of normally parallel bars each provided with gage seats therein and with attaching means including a pin, yieldable connecting means permitting relative movement of the bars in the same plane, and a plurality of gages adapted to be selectively placed in the gage seats to vary the relative positions of said bars.

GEORGE E. BEGGS.